United States Patent
Tucholski

[15] 3,670,499
[45] June 20, 1972

[54] VEHICULAR TRANSMISSION SUMP SYSTEM

[72] Inventor: Leon A. Tucholski, Belleville, Mich.
[73] Assignee: General Motors Corporation, Detroit, Mich.
[22] Filed: March 18, 1971
[21] Appl. No.: 125,698

[52] U.S. Cl. .................. 60/54, 60/52 SP, 60/DIG. 3, 60/DIG. 5
[51] Int. Cl. ................................................ F16h 41/30
[58] Field of Search .......... 60/54, 52 HE, 52 SR, DIG. 3, 60/DIG. 5

[56] References Cited
UNITED STATES PATENTS

| | | | |
|---|---|---|---|
| 2,719,616 | 10/1955 | Ahlen | 60/DIG. 5 |
| 2,721,520 | 10/1955 | Termont | 60/52 HE X |
| 2,731,892 | 1/1956 | Simmonds | 60/52 HE X |
| 2,973,626 | 3/1961 | Sinclair | 60/54 |

Primary Examiner—Edgar W. Geoghegan
Attorney—J. L. Carpenter and R. L. Phillips

[57] ABSTRACT

A vehicular transmission has an auxiliary sump provided by the transmission's case extension with a jet pump operated by transmission pressure maintaining a predetermined oil level in the transmission's main sump by delivering the excess oil to the auxiliary sump from which the oil drains to the main sump.

5 Claims, 4 Drawing Figures

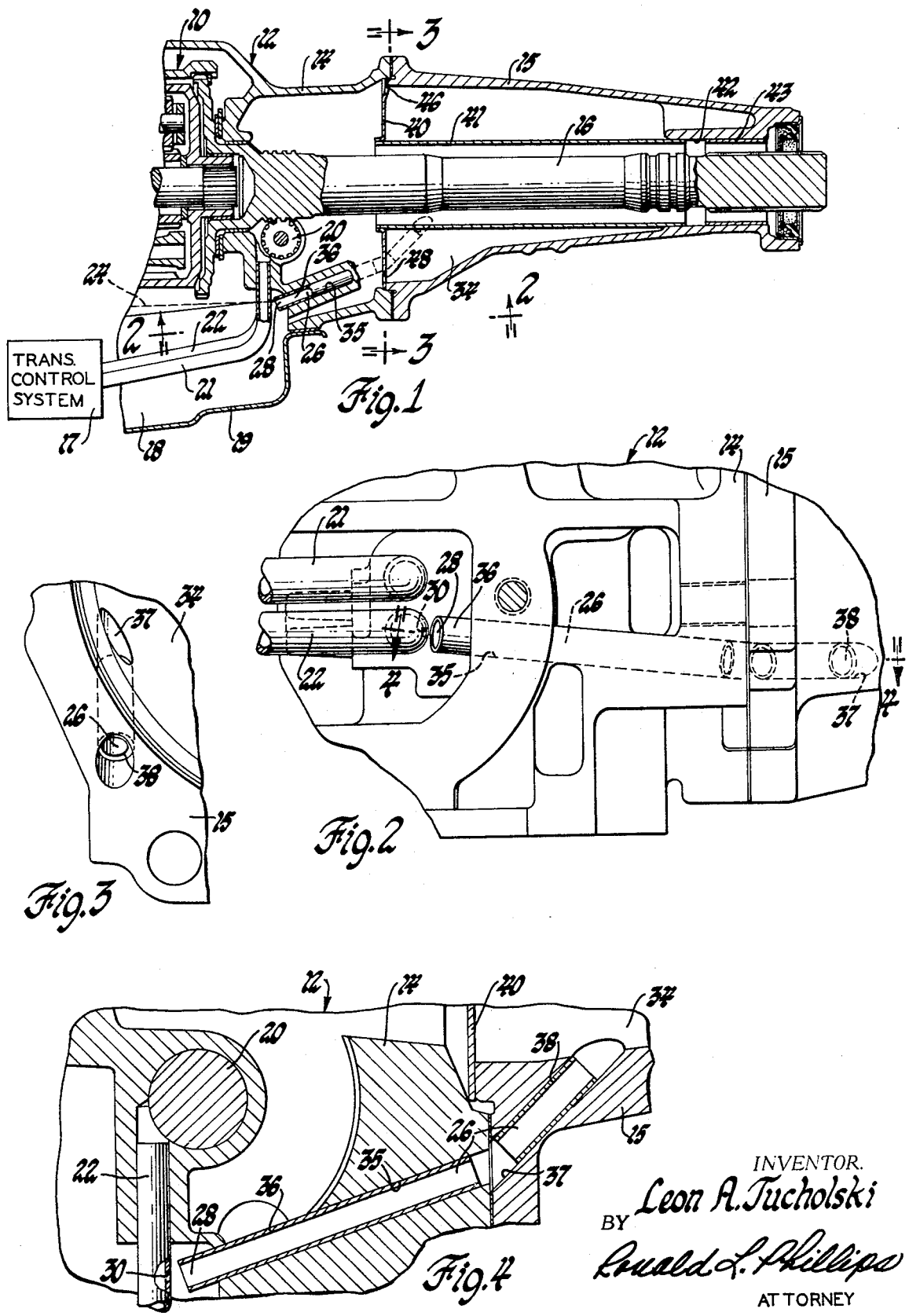

VEHICULAR TRANSMISSION SUMP SYSTEM

This invention relates to vehicular transmissions and more particularly to vehicular transmission sump systems.

In a central hydraulic system for a vehicle having an automatic transmission and other hydraulically operated equipment such as power steering, the transmission pump that is normally located in the transmission housing may be used as the system's sole pressure source. Since such a central hydraulic system's oil supply demand is considerably greater than the transmission alone, there is the requirement that more oil be available for satisfying these larger demands than is made possible by the standard size transmission sump. Two obvious ways of increasing sump capacity are to make the transmission oil pan deeper and/or to raise the oil level in the transmission. However, it has been found that in at least some present day transmissions, the oil pan cannot be made deeper to provide the required increase in oil capacity since to do so would reduce ground clearance below an acceptable minimum. On the other hand, it has been found that raising the oil level to obtain the necessary sump capacity results in the transmission's rotating parts dipping into the oil and thereby causing foaming and aeration.

The present invention provides increased sump capacity in the transmission without any change in the transmission oil pan and without raising the oil level during transmission operation. According to the present invention, an auxiliary sump is formed in a heretofore unused space within the transmission case and the existing sump provided by the oil pan is overfilled and used as the main sump. A jet pump which is operated by pressure derived from the transmission control system has an inlet located at the desired operating oil level in the transmission's main sump and is connected to pump the excess oil from the main sump to the auxiliary sump down to the desired oil level. A passage connects the auxiliary sump to the main sump and is sized so that oil drains to the main sump at a flow rate slower than the rate of flow to the auxiliary sump.

An object of the present invention is to provide a new and improved transmission sump system.

Another object is to provide in a transmission increased sump capacity without enlarging the existing sump and without raising the normal operating liquid level.

Another object is to provide in a transmission a jet pump that is operated by transmission pressure to pump liquid from a main reservoir down to a predetermined level and deliver the excess liquid to an auxiliary sump from which the liquid drains at a slower flow rate to the main reservoir.

Another object is to provide in a transmission an auxiliary reservoir in the transmission's case extension in addition to the reservoir provided by the transmission oil pan wherein oil is pumped by a jet pump operated by transmission pressure from the oil pan to the auxiliary reservoir and is returned by gravity from the auxiliary reservoir at a slower rate to the oil pan.

These and other objects of the present invention will be more apparent from the following description and drawing in which:

FIG. 1 is a partial longitudinal sectional view of a vehicular transmission having a transmission sump system constructed according to the present invention.

FIG. 2 is an enlarged view taken on the line 2—2 in FIG. 1.

FIG. 3 is an enlarged view taken on the line 3—3 in FIG. 1.

FIG. 4 is a view taken on the line 4—4 in FIG. 2.

Referring to the drawing, FIG. 1 illustrates the invention for use in a vehicular transmission of the type disclosed in U.S. Pat. No. 3,321,056 issued to Winchell et al. and entitled "Transmission and Control System," such a transmission arrangement generally comprising a three element hydrodynamic torque converter and range gearing arrangement generally designated at 10 housed within a housing or case generally designated at 12. The transmission housing includes a main case 14 that houses the converter and range gearing arrangement 10 and a case extension 15 that is secured to the rear end of main case 14 and houses the transmission's output shaft 16 from which power is normally taken by a prop shaft assembly and delivered via a differential to the vehicle's driving wheels. The transmission further includes a control system which is schematically shown in block form at 17 in FIG. 1. Oil is delivered under pressure to the control system by an engine driven pump that is supplied with oil stored in a sump 18 which is provided by an oil pan 19 secured to the underside of the main case 14. The main oil pressure supply in the control system has a regulated pressure and is delivered to various components in the control system including a governor 20. Governor 20 is geared as shown to the transmission's output shaft 16 and is supplied with main oil pressure by a pipe 21. Governor 20 operates to deliver a variable pressure to a pipe 22 that is connected to deliver this pressure to other components in the transmission control system 17. The governor 20 causes the pressure in passage 22 to vary with output shaft speed so that this pressure, which is normally called governor pressure, increases with increase in vehicle speed.

The converter and range gearing arrangement 10 and the control system 17 therefor are conventional and operate to provide several forward speed range drives and a reverse drive with the regulated pressure supply in pipe 21 and the governor pressure in pipe 22 serving operational control roles. For a more detailed understanding of the structure and operation of the overall transmission arrangement, reference may be made to the aforementioned Winchell et al. patent. For central hydraulic system usage, the pump providing the pressure source for the transmission control and other hydraulically operated vehicle equipment such as power steering may be driven by a pump drive arrangement as disclosed in copending U.S. Pat. application Ser. No. 122,041 filed Mar. 8, 1971 by Erkki A. Koivunen entitled "Vehicular Transmission Pump Drives." Furthermore, the central hydraulic system may be of the particular type disclosed in copending United States patent application Ser. No. 51,572 filed July 1, 1970, by Paul D. Stevenson and Leon A. Tucholski entitled "Central Hydraulic System for a Vehicle."

According to the present invention, the oil capacity of the hydraulic system is increased without changing the existing oil pan in any way and without raising the normal predetermined operating oil level in the main sump when the engine is in operation. Referring to FIG. 1, the dashed line 24 indicates the normal operating oil level for this particular transmission which is selected to prevent the rotating parts of the transmission from dipping into the oil.

According to the present invention, an oil passage 26 is arranged to have an inlet 28 aligned with and close to a radial port 30 in a vertical section of the governor pipe 22 with the port 30 located at the normal operating oil level 24 in the main sump 18. The oil delivery passage 26 is inclined and extends from the main sump to an auxiliary sump 34 that is provided in the case extension 15. As shown in FIGS. 1, 2 and 4, the oil delivery passage 26 is provided through the existing main case 14 by boring an inclined hole 35 in the lower portion of this case in an area where this portion is almost continuous to the rear main case face and inserting in this bored hole a pipe 36. The hole 35 where it terminates at the rear end face of main case 14 is aligned as shown in FIGS. 2 and 4 with a bored hole 37 in the case extension 15. Hole 37 extends from the front face of the case extension 15 inwardly as shown in FIGS. 2, 3 and 4 through the case extension wall to the interior of the case extension and thus to the auxiliary sump 34. Hole 37 terminates at a point close to the central axis of the transmission as shown in FIG. 1. A pipe 38 fitted in hole 37 insures that the oil passage 26 is not open through the case extension wall to the exterior of the transmission.

The auxiliary sump 34 is concentric with the output shaft 16 and is separated from the main sump 18 by a plate 40 that is located at the juncture of the main case 14 with the case extension 15 and is secured in this position by being sandwiched between these case members as shown in FIG. 1. Plate 40 has a flanged central opening receiving a sleeve 41 through which the output shaft 16 extends. Sleeve 41 is press fitted and thereby sealingly secured at its front end to the flanged portion of the plate 40 and is also press fitted and thereby sealingly secured at its rear end in the front end of a bore 42 in which a bushing 43 is normally mounted to support the output shaft 16 at its connection to the prop shaft assembly at the rear end of case extension 15. The auxiliary sump 34 thus formed by case extension 15, plate 40 and sleeve 41 is annular in shape and is elevated above the normal operating oil level 24. The auxiliary sump 34 is vented by a vent hole 46 through the top of plate 40 and is connected through a drain-back orifice 48 to the main sump 18. Since the auxiliary sump 34 is completely internal of the transmission there is no additional tendency toward external leaks.

The port 30 in governor pipe 22 directs a jet stream into the inlet 28 of the oil delivery passage 26 while maintaining the upstream governor pressure to provide a jet pump or aspirator that suctions oil from the main sump 18 at the normal operating oil level 24 and forces this oil to the auxiliary sump 34. The size of the drain-back orifice 48 determines that governor pressure at which the total jet pump flow (oil from the governor pipe 22 plus oil from the main sump 18) is sufficient to overcome flow through the drain-back orifice 48, i.e., the return flow rate permitted is not more than the supply rate. Thus, the size of the drain-back orifice 48 determines the governor pressure and thus vehicle speed at which the jet pump will operate to maintain the desired oil level with the smaller the drain size, the lower the vehicle speed above which there is provided oil level control in the main reservoir.

Describing now a typical fill and sump system operation, the main sump 18 is overfilled a predetermined amount with the result that the oil is then at a certain level above the desired operating oil level 24. Then with the engine operating and the vehicle stationary oil pressure is delivered to the transmission control system using the main sump 18 with the higher than normal oil level, there being no jet pump operation at this time since there is no governor pressure when the vehicle is not moving. This high oil level causes no problems, however, since the transmission's rotary parts which would dip into the oil at this high level are not rotating when the vehicle is stationary. Then when the vehicle starts to move and governor pressure is then made available to governor pipe 22, the jet pump action starts delivering the excess oil from the main sump 18 to the auxiliary sump 34 to reduce the oil level to the normal operating oil level 24 which is below the rotating transmission parts. Preferably, the size of the drain-back orifice 48 is made so that this orifice will return all of the governor oil flowing through the port 30 but will not return governor oil plus suctioned oil from the main sump when there is jet pump action. Thus when the oil level is above the jet pump port 30 the jet pump forces the excess oil to the auxiliary sump 34 until the desired level 24 is reached. Thereafter, the oil level in the main sump will be maintained where the inlet flow of the excess oil to the jet pump will satisfy the condition of jet feed plus inlet flow equals drain-back flow which results in a stable flow condition and a regulated oil level.

While the pressure source for the jet pump has been demonstrated as being provided by governor pressure, it will also be understood that this pressure supply could come directly from main pressure so that jet pump action to provide oil level control is available when the vehicle is stationary with the engine running rather than just when the vehicle is in motion. It will also be appreciated that outside of usage with central hydraulic systems, the subject sump arrangement could also be used, for example, to provide greater high temperature capabilities for trailer towing or high speed operation at high ambient temperatures.

The above described embodiment is illustrative of the invention which may be modified within the scope of the appended claims.

I claim:

1. In a transmission operated by liquid under pressure, a first reservoir having a predetermined normal operating liquid level, a second reservoir capable of storing liquid at levels above said predetermined liquid level, a liquid pressure source for transmission operation, jet pump means operated by liquid pressure derived from said liquid pressure source for pumping liquid from said first reservoir down to a level substantially equal to said predetermined liquid level, liquid delivery passage means for delivering the pumped liquid to said second reservoir, and liquid return passage means for returning liquid from said second reservoir to said first reservoir.

2. In a transmission operated by liquid under pressure, a first reservoir having a predetermined normal operating liquid level, a second reservoir capable of storing liquid at levels above said predetermined liquid level, a liquid pressure source for transmission operation, jet pump means operated by liquid under pressure derived from said liquid pressure source for pumping liquid from said first reservoir down to said predetermined liquid level, liquid delivery passage means for delivering the pumped liquid to said second reservoir, and liquid return passage means for returning liquid from said second reservoir to said first reservoir at a flow rate slower than the rate of flow to said second reservoir.

3. In a transmission operated by liquid under pressure, a first reservoir having a predetermined normal operating liquid level, a second reservoir capable of storing liquid at levels above said predetermined liquid level, a transmission control system including a liquid pressure source and a governor providing a governor pressure changing with vehicle speed for controlling transmission operation, jet pump means operated by liquid pressure derived from said governor pressure for pumping liquid from said first reservoir down to a level substantially equal to said predetermined liquid level, liquid delivery passage means for delivering the pumped liquid to said second reservoir, and liquid return passage means for returning liquid from said second reservoir to said first reservoir at a flow rate slower than the rate of flow to said second reservoir.

4. In a transmission operated by oil under pressure, a main transmission housing having an output shaft extending therefrom, a hollow housing extension secured to said main transmission housing and housing said output shaft, an oil pan secured to the underside of said main transmission housing to provide a main reservoir for storing the oil used in the operation of said transmission, wall means separating the interior of said housing extension from said oil pan to provide an auxiliary reservoir, an oil pressure source for transmission operation, jet pump means operated by oil pressure derived from said oil pressure source an having an inlet located at a predetermined normal operating oil level in said first reservoir for pumping oil from said first reservoir down to said predetermined oil level, oil delivery passage means for delivering the pumped oil to said auxiliary reservoir, and oil return passage means for returning oil from said auxiliary reservoir to said main reservoir at a flow rate slower than the delivery rate to said auxiliary reservoir.

5. In a transmission operated by oil under pressure, a main transmission housing having an output shaft extending therefrom, a hollow housing extension secured to said main transmission housing and housing said output shaft and opening to the interior of said main transmission housing, an oil pan secured to the underside of said main transmission housing to provide a main reservoir for storing the oil used in the operation of said transmission, wall means separating the interior of said housing extension from said oil pan to provide an auxiliary reservoir within said housing extension elevated relative to said main reservoir, said wall means comprising a plate member and a sleeve member, said plate member extending across the opening between said housing extension and said main transmission housing and having a central opening, said output shaft extending through said opening in said plate member and also through said sleeve member, said sleeve member sealingly secured at one end to said plate member at said opening and sealingly secured at the other end to said housing extension, an oil pressure source for transmission operation, jet pump means operated by oil pressure derived from said oil pressure source and having an inlet located at a predetermined normal operating oil level in said first reservoir for pumping oil from said first reservoir down to said predetermined oil level, oil delivery passage means for delivering the pumped oil to said auxiliary reservoir, and oil return passage means in said plate member for draining oil from said auxiliary reservoir to said main reservoir at a flow rate slower than the delivery rate to said auxiliary reservoir.

* * * * *